(12) United States Patent
Kinkel

(10) Patent No.: US 6,367,277 B1
(45) Date of Patent: Apr. 9, 2002

(54) EVAPORATIVE COOLING APPARATUS

(76) Inventor: Stephen W. Kinkel, 5419 E. Calle Del Medio, Phoenix, AZ (US) 85018

( * ) Notice: Subject to any disclaimer, the term of this patent is extended or adjusted under 35 U.S.C. 154(b) by 0 days.

(21) Appl. No.: 09/832,533

(22) Filed: Apr. 10, 2001

(51) Int. Cl.[7] .............................. F28D 5/00; B01D 47/16
(52) U.S. Cl. .............................. 62/310; 62/315; 261/98
(58) Field of Search .................... 62/310, 304, 314, 62/315, 259.1, 259.4, 91; 261/DIG. 3, DIG. 43, 105, 98, 106

(56) References Cited

U.S. PATENT DOCUMENTS

| | | | |
|---|---|---|---|
| 4,968,457 A | * | 11/1990 | Welch |
| 5,273,687 A | * | 12/1993 | Osborne |
| 5,606,868 A | * | 3/1997 | Calvert .................... 62/315 |
| 5,857,350 A | * | 1/1999 | Johnson et al. ............ 62/314 |

* cited by examiner

Primary Examiner—Denise L. Esquivel
Assistant Examiner—Chen-Wen Jiang
(74) Attorney, Agent, or Firm—Jordan M. Meschkow; Lowell W. Gresham; Meschkow & Gresham, P.L.C.

(57) ABSTRACT

An evaporative cooling apparatus (20) includes a housing (22) and cooling media (48) contained in the housing (22). The cooling media (48) has an air inlet portion (46) and an air outlet portion (60). The air inlet portion (46) is positioned adjacent an air entry side (42) of the housing (22). A fresh water delivery system (54, 136) delivers fresh water (34) to a face (126) of the air inlet portion (46) of the cooling media (48). A recirculated water delivery system (56) delivers sump water (38) from a sump (40) to the air outlet portion (60). A fan section (26) is proximate an air exit side (44) of the housing (22). The fan section draws outside air (50) through the air entry side (42) of the housing (22) and into the cooling media (48) from the air inlet portion (46) through the air outlet portion (60) to produce cooled air (52).

29 Claims, 5 Drawing Sheets

EVAPORATIVE COOLING APPARATUS

TECHNICAL FIELD OF THE INVENTION

The present invention relates to the field of evaporative cooling systems. More specifically, the present invention relates to an evaporative cooling apparatus that utilizes fresh water to control a buildup of mineral deposits in the apparatus.

BACKGROUND OF THE INVENTION

Evaporative coolers are used in a variety of settings including factories, warehouses, workshops, and agricultural structures, as well as in homes and offices. Evaporative coolers are an attractive alternative to conventional air conditioning and mechanical refrigeration systems because they require minimal parts, are relatively simple to manufacture and maintain, are inexpensive to operate, and do not use ozone damaging refrigerants.

Generally, a evaporative cooling apparatus includes a large fan and water-wetted pads, also known as cooling media, mounted perpendicular to an outside air stream. Water is drawn from a sump and distributed over the top of the cooling media where the water flows down through the cooling media back to the sump. The cooling media absorbs some of this water producing a water field in the path of the outside air stream. The fan draws the outside air through the cooling media, which cools the air through the evaporation of the water in the cooling media, and blows the cooled air into the house. The evaporative cooler also slightly increases the humidity of the entering air. The cooling media on an evaporative cooler is a fairly efficient air filter, trapping particles on the wet surface. A continuous wetting of the cooling media flushes the trapped particles into the sump, or reservoir, below the cooling media.

Evaporative coolers rely on the efficiency of the cooling media to obtain maximum performance. Unfortunately, minerals supplied in the water will concentrate in the sump and eventually begin to create mineral deposits, also known as scale on the cooling media. The scale buildup in the sump can also undesirably affect the wet components, such as the recirculation pump. Thus, these deposits can severely degrade the efficiency of the cooling media and other wet components, shorten their useful life, and increase the cost of maintaining the evaporative cooler. In addition, scale can trap biological organisms and other organic materials that produce odors, provide a medium for the growth of bacteria and molds, and cause other negative effects.

A technique sometimes used to manage scale in an evaporative cooler is to periodically use acid treatments to dissolve the scale. Although acid will dissolve some of the scale, the acid has the undesirable affect of increasing corrosion in the evaporative cooler. Another technique is to frequently replace the cooling pads and physically scrape and remove scale from the cooler. This can become expensive and quite time consuming. As such, neither of these techniques is considered acceptable.

Some evaporative coolers are manufactured with a bleed-off system that continuously leaks a small quantity of water from the water distribution system in order to dilute mineral concentrations in the water in the sump. Unfortunately, even with the use of a bleed-off system, scale still forms at the point of greatest evaporation, that is, on the cooling media. Other evaporative coolers come with a sump dump, or blow-down system, that periodically dumps the water from the sump while the cooler is being operated. A blow-down system is useful in dusty areas, because it cleans the sump of filtered dirt and particles. Unfortunately, like the bleed-off systems, scale still forms at the point of greatest evaporation, that is, on the cooling media.

The problem of scale buildup is exacerbated in evaporative coolers used for cooling large industrial settings, such as warehouses, factories, agricultural structures, and so forth. These industrial evaporative coolers typically deliver an air volume of 10,000 cubic feet per minute (CFM) or higher, drawn through cooling media that may be eight to thirty-six inches thick. This is in contrast to residential evaporative coolers that typically deliver an air volume of 3300 CFM, 4500 CFM, or 6500 CFM, drawn through cooling media that is less than eight inches thick.

The greater cooling requirements of industrial evaporative coolers cause industrial coolers to evaporate significantly more water than their residential counterparts. As such, scale buildup on the cooling media is greatly increased. Unfortunately, component replacement and labor costs associated with repairing an industrial evaporative cooler are much greater then that of residential coolers. The costs are much higher due to the large housing size, the large cooling media, the high air draw fans, and the high water volume recirculation pumps needed to produce cooled air at air volumes in excess of 10,000 CFM.

Accordingly what is needed is an evaporative cooling apparatus that effectively controls the buildup of scale on the cooling media in order to maintain maximum cooling efficiency of the cooling media and to reduce costs associated with maintenance and repair of the evaporative cooling apparatus.

SUMMARY OF THE INVENTION

Accordingly, it is an advantage of the present invention that an evaporative cooling apparatus is provided.

It is another advantage of the present invention that an evaporative cooling apparatus is provided that effectively controls the buildup of mineral deposits on the cooling media.

It is another advantage of the present invention that an evaporative cooling apparatus is provided that may be used in industrial settings.

Yet another advantage of the present invention is that an evaporative cooling apparatus is provided that is cost effective to maintain and repair.

The above and other advantages of the present invention are carried out in one form by an evaporative cooling apparatus. The evaporative cooling apparatus includes a housing having an air entry side, an air exit side, and a sump. Cooling media is contained in the housing. The cooling media has an air inlet portion and an air outlet portion, the air inlet portion being adjacent the air entry side of the housing. A fresh water delivery system delivers fresh water to the air inlet portion of said cooling media, and a recirculated water delivery system delivers sump water from the sump to the air outlet side of the cooling media. A fan section proximate the air exit side of the housing draws air through the air entry side of the housing and into the cooling media from the air inlet portion through the air outlet portion to cool the air.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
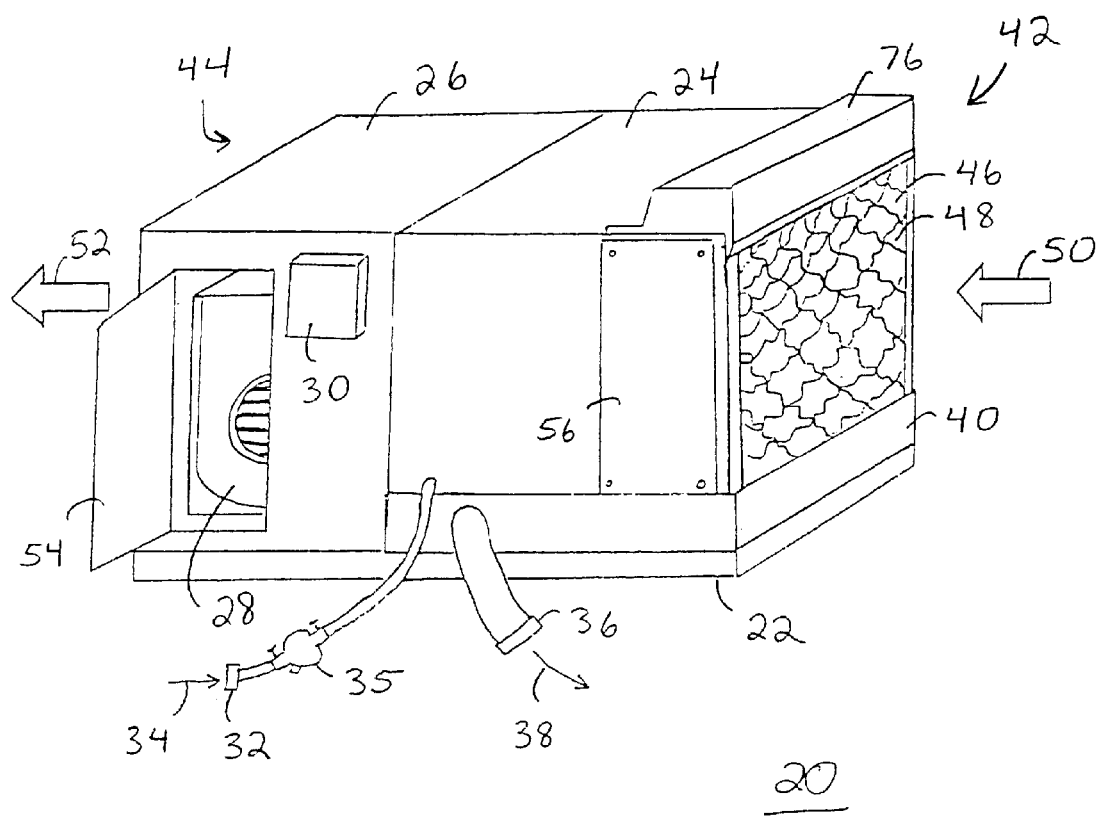
FIG. 1 shows a perspective view of an evaporative cooling apparatus in accordance with a preferred embodiment of the present invention.

FIG. 1 shows a perspective view of an evaporative cooling apparatus 20 in accordance with a preferred embodiment of the present invention. Evaporative cooling apparatus 20 includes a housing 22 separated by function into a wet section 24 and a fan section 26. Wet section 24 of housing 22 houses those components (discussed below) of evaporative cooling apparatus 20, that become wet or are otherwise subjected to significant moisture during the operation of cooler 20. Whereas, fan section 26 of housing 22 includes a fan 28 and associated electrical controls 30, known to those skilled in the art for operating cooler 20.

A water inlet 32 of a fresh water delivery system (discussed below) is located in wet section 24. Water inlet 32 is adapted to receive fresh water, represented by an arrow 34, obtained from a water source (not shown) external to apparatus 20. A backflow prevention device 35 may be coupled in-line with inlet 32. Backflow prevention device 35 stops a backflow of sump water 38 from evaporative cooling apparatus 20 toward the water source to prevent contamination of the water source. A water outlet 36 of a recirculated water delivery system (discussed below) is located in wet section 24. Water outlet 36 is configured to expel recirculated sump water, represented by an arrow 38, that drains into a sump 40 of wet section 24.

The term "fresh water" is used to distinguish the water entering apparatus 20 from an external source from the water being recirculated through apparatus 20, i.e. "sump water". Fresh water 34 is significantly lower in particulate content, such as minerals and organic matter, then sump water 38. For example, fresh water 34 may have a particulate content of approximately six hundred parts per million (ppm). In contrast, sump water 38 may have a particulate content of approximately fifteen hundred ppm.

Housing 22 includes an air entry side 42 and an air exit side 44. An air inlet portion 46 of a cooling pad, or cooling media 48, is located adjacent air entry side 42, and fan 28 is located proximate air exit side 44. Generally, fan 28 draws outside air, represented by an arrow 50, through air entry side 42 of housing 22 and into cooling media 46 contained in wet section 24 of housing 22 to produce cooled air, represented by an arrow 52, for distribution from air exit side 44 of housing 22. It should be readily apparent to those skilled in the art that ductwork (not shown) is coupled to air exit side 44 of housing 22 for distributing cooled air 52 throughout a structure (not shown) to be cooled.

Housing 22 may also include an access door 54 for access to fan 28, and a side lift off panel 56 for access and removal of cooling media 48. In a preferred embodiment, housing 22 is constructed from stainless steel, although, other materials such as galvanized steel and painted steel may be used.

Figure 2:
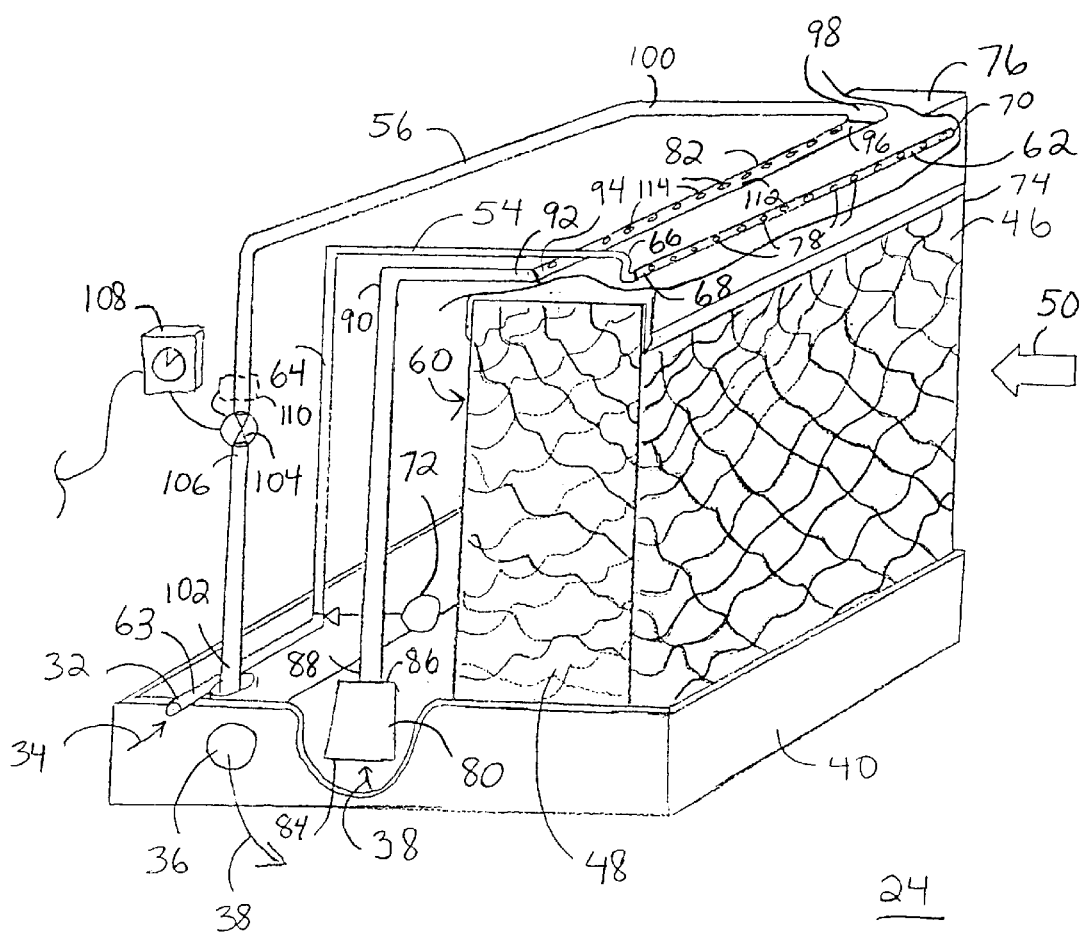
FIG. 2 shows a perspective view of a wet section of the evaporative cooling apparatus of FIG. 1.

Referring to FIG. 2 in connection with FIG. 1, FIG. 2 shows a perspective view of wet section 24 of evaporative cooling apparatus 20 (FIG. 1). Internal components of wet section 24 include cooling media 48, a fresh water delivery system 54, and a recirculated water delivery system 56. Fresh water delivery system 54 delivers fresh water 34 to air inlet portion 46 of cooling media 48. In addition, recirculated water delivery system 56 delivers sump water, represented by an arrow 38, drawn from sump 40 to the remainder of cooling media 48, that is, an air outlet portion 60 of cooling media 48. Consequently, fresh water 34, having a lower particulate count than sump water 38, wets cooling media 48 at the point of greatest evaporation, and sump water 38 wets cooling media 48 at the point where little evaporation is taking place.

In an exemplary embodiment, evaporative cooling apparatus 20 (FIG. 1) is configured as an industrial evaporative cooler for delivering an air volume of cooled air 52 (FIG. 1) of 10,000 cubic feet per minute (CFM) or higher. As such, cooling media 48 may be a cellulose fiber or synthetic fiber pad eight to thirty-six inches thick to effectively cool the high volume of air.

Fresh water delivery system 54 generally includes water inlet 32 and a first distributor element, or pipe 62, in fluid communication with water inlet 32. More specifically, water inlet 32 is located at an inlet end 63 of a fresh water conduit 64. An outlet end 66 of fresh water conduit 64 is coupled to a first end 68 of first distributor pipe 62. A second end 70 of first distributor pipe 62 is capped, or blocked. A float valve 72, coupled in-line with fresh water conduit 64, enables receipt of fresh water 34 into fresh water delivery system 54 in response to a water level in sump 40.

First distributor pipe 62 is positioned proximate an upper edge 74 of cooling media 48. A shield 76 covers first distributor pipe 62. Shield 76 is partially cut out in FIG. 2 to reveal a plurality of spaced-apart openings 78 along first distributor pipe 62. Fresh water 34 is input into fresh water delivery system 54 at inlet 32 and travels through fresh water conduit 64 into first distributor pipe 62. Fresh water 34 is expelled from fresh water delivery system 54 through spaced-apart openings 78 to wet air inlet portion 46 of cooling media 48. Any portion of fresh water 34 that does not evaporate while wetting air inlet portion 46 eventually drains from cooling media 48 into sump 40.

Recirculated water delivery system 56 generally includes a recirculation pump 80 and a second distributor element, or pipe 82, in fluid communication with recirculation pump 80. More specifically, recirculation pump 80 has a sump water inlet 84, positioned in sump 40, and a sump water outlet 86. Sump 40 is shown partially cut-out to reveal recirculation pump 80. Sump water outlet 86 is coupled to an inlet end 88 of a sump water conduit 90. An outlet end 92 of sump water conduit 90 is coupled to a first end 94 of second distributor pipe 82. A second end 96 of second distributor pipe 82 is coupled to an inlet 98 of a sump dump conduit 100. Water outlet 36 is positioned at an outlet 102 of sump dump conduit 100.

A control valve 104 is coupled in-line with sump dump conduit 100 and has an outlet side 106 in fluid communication with outlet 36. Control valve 104 is periodically opened to expel sump water 38 from second distributor pipe 82 through outlet 36. A timer 108 actuates control valve 104 to open at predetermined intervals to dump, or flush, sump water 38 from recirculated water delivery system 56.

Alternatively, evaporative cooling apparatus 20 (FIG. 1) may include a conductivity sensor 110 (generally shown in ghost form) that actuates control valve 104 to open when a detected particulate content of sump water 38 exceeds a predetermined particulate content level. That is, conductivity sensor 110 takes a measurement of the electrical conductance of sump water 38 in sump dump conduit 100. The electrical conductance measurement is used to ascertain the total dissolved solids, or particulate content, of sump water 38 which is then compared to the predetermined particulate content level to affect actuation of control valve 104.

Second distributor pipe 82 has a longitudinal portion 112 positioned above cooling media 48 and covered by shield 76. A plurality of spaced-apart openings 114 are located along longitudinal portion 112 of second distributor pipe 82, as best shown in FIG. 2. In operation, sump water 38 is input into recirculated water delivery system 56 when pump 80 draws sump water 38 from sump 40 into sump water inlet 84. Pump 80 outputs sump water 38 from sump water outlet 86 into a sump water conduit 90. Sump water 38 travels through sump water conduit 90 into second distributor pipe 82 and is expelled from recirculated water delivery system 56 through spaced-apart openings 114 to wet air outlet portion 60 of cooling media 48. The portion of sump water 38 that does not evaporate while wetting air outlet portion 60 eventually drains from cooling media 48 into sump 40.

Sump water 38 also travels into sump dump conduit 100, where control valve 104 in a normally closed position prevents escape of sump water 38 from recirculated water delivery system 56. As sump water 38 is recirculated through recirculated water delivery system 56, the particulate content, i.e., the dissolved minerals and organic matter, of sump water 38 draining into sump 40 from cooling media 48 increases. That is, as fresh water 34 and sump water 38 evaporate to produce cooled air 52, the particulates of the evaporated water remain in cooling media 46. This particulate content is flushed into sump 40 by the continuous wetting of cooling media 48 with fresh water 34 and sump water 38.

Accordingly, at periodic time intervals controlled by timer 108, or alternatively, in response to conductivity measurements by conductivity sensor 110, control valve 104 is actuated to an open position to flush, or dump, a significant quantity of sump water 38 from recirculated water delivery system 56. This flushing action causes a rapid increase in the velocity of sump water 38 flowing through recirculated water delivery system 56. The increased velocity causes a scrubbing action in second distributor pipe 92, thus cleaning pipe 92 and spaced-apart openings 114 of mineral deposits.

The periodic dumping of sump water 38 from recirculated water delivery system 56 also results in a relatively sudden decrease in the water level in sump 40. The lower water level is sensed by float valve 72 which opens to enable a flow of fresh water 34 into fresh water delivery system 54. Fresh water 34 rinses air inlet portion 46 of cooling media 48 to wash particulates out of cooling media 48 and into sump 40. Fresh water 34, which is lower in particulate content than sump water 38, dilutes sump water 38 thereby decreasing the particulate content of sump water 38.

The flushing, cleaning, enabling, and rinsing operations are substantially simultaneous operations. That is, the cleaning, enabling, and rinsing functions of evaporative cooling apparatus 20 are initiated as soon as control valve 104 is actuated to an open position. The substantially simultaneous operations mitigate the problem of mineral, or scale, buildup in cooling media 48 and in recirculated water delivery system 56. As such, the cooling efficiency of evaporative cooling apparatus 20 is enhanced. Furthermore, the life of cooling media 48, recirculated water delivery system 56, and other wet components is extended by controlling the amount of mineral buildup in evaporative cooling apparatus 20.

Conventional evaporative coolers deliver fresh water directly to the sump. The conventional fill method causes water, both fresh and recirculated sump water, to splash onto the wet components within the wet section of a conventional evaporative cooler. The splashed water further exacerbates the problem of scale buildup within the wet compartment. In contrast, fresh water 34 is delivered to evaporative cooling apparatus 20 via fresh water conduit 64 of fresh water delivery system 54 thereby avoiding the problem of scale buildup due to the splashed water. In addition, fresh water 34, having the lowest particulate content, is delivered directly to the point of greatest evaporation, that is, on air inlet portion 46 of cooling media 48.

Figure 3:
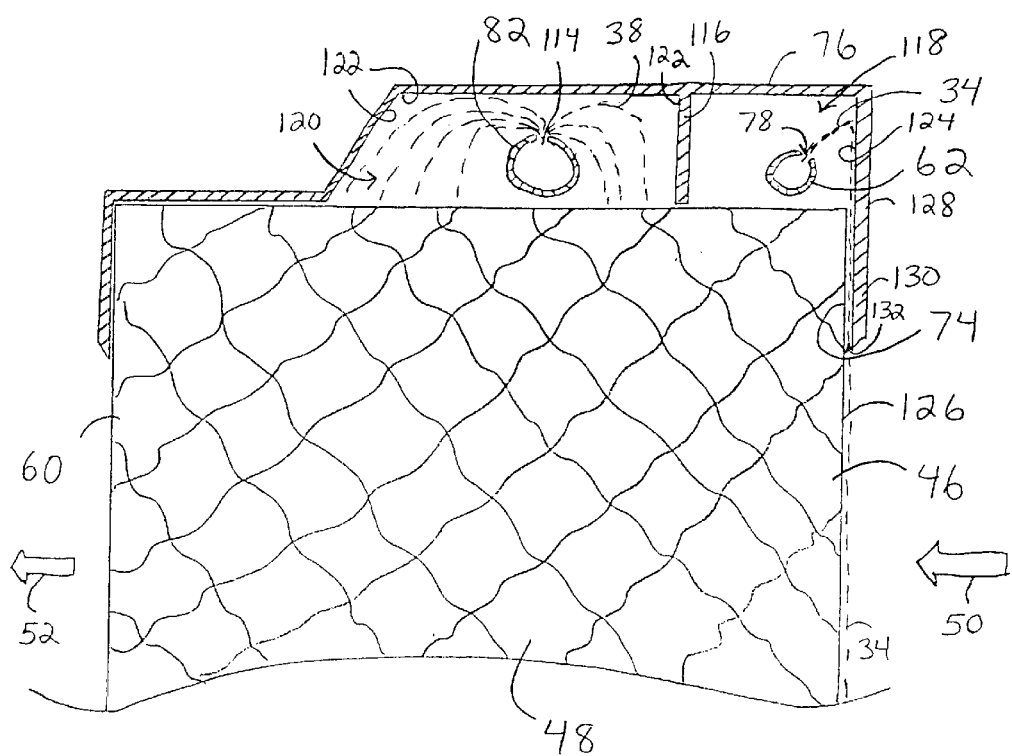
FIG. 3 shows a sectional side view of a shield and water distributor elements of the evaporative cooling apparatus.

FIG. 3 shows a sectional side view of shield 76, first distributor pipe 62, and second distributor pipe 82 of evaporative cooling apparatus 20 (FIG. 1). Shield 76 includes a partition 116 separating shield 76 into a first compartment 118 and a second compartment 120. First distributor pipe 62 is positioned in first compartment 118 and second distributor pipe 82 is positioned in second compartment 120. Inner surfaces 122 of second compartment 120 serve to direct sump water 38 over air outlet portion 60 of cooling media 48. Partition 116 largely prevents particulate laden sump water 38 from flowing through air inlet portion 46 of cooling media 48. In addition, partition 116 largely prevents sump water 38 from spraying on first distributor pipe 62 and contaminating fresh water delivery system 54 or otherwise clogging openings 78.

As shown in FIG. 3, an inside front surface 124 of first compartment 118 serves to direct fresh water 34 over a face 126 of air inlet portion 46 of cooling media 48. More specifically, spaced-apart openings 78 of first distributor pipe 62 are upwardly and forwardly oriented on pipe 62. This upward and forward orientation of openings 78 causes fresh water 34, exiting from each of openings 78, to contact inside front surface 124 within first compartment 118 of shield 76.

Shield 76 further includes a front surface 128 having a downwardly extending lip 130. Lip 130 covers upper edge 74 of cooling media 48. As fresh water 34 exits from each of openings 78 and contacts inside front surface 124, fresh water 34 flows through a gap 132 formed between lip 130 and upper edge 74 of cooling media 48. Thus, upwardly and forwardly oriented openings 78 of pipe 62 function cooperatively with inside front surface 124 of shield 76 and lip 130 to direct fresh water 34 to the point of highest evaporation, that is face 126 of cooling media 48.

In a preferred embodiment, first distributor pipe 62 is approximately thirty to thirty-five percent smaller in diameter than second distributor pipe 82. First pipe 62 is smaller in diameter because first pipe 62 only delivers enough fresh water 34 to wet cooling media 48 to a depth of one to two inches from face 126 inwardly. In contrast, second pipe 82 delivers significantly more sump water 38 because sump water 38 is used to wet the remainder of the eight to thirty-six inch thick cooling media 48.

Figure 4:
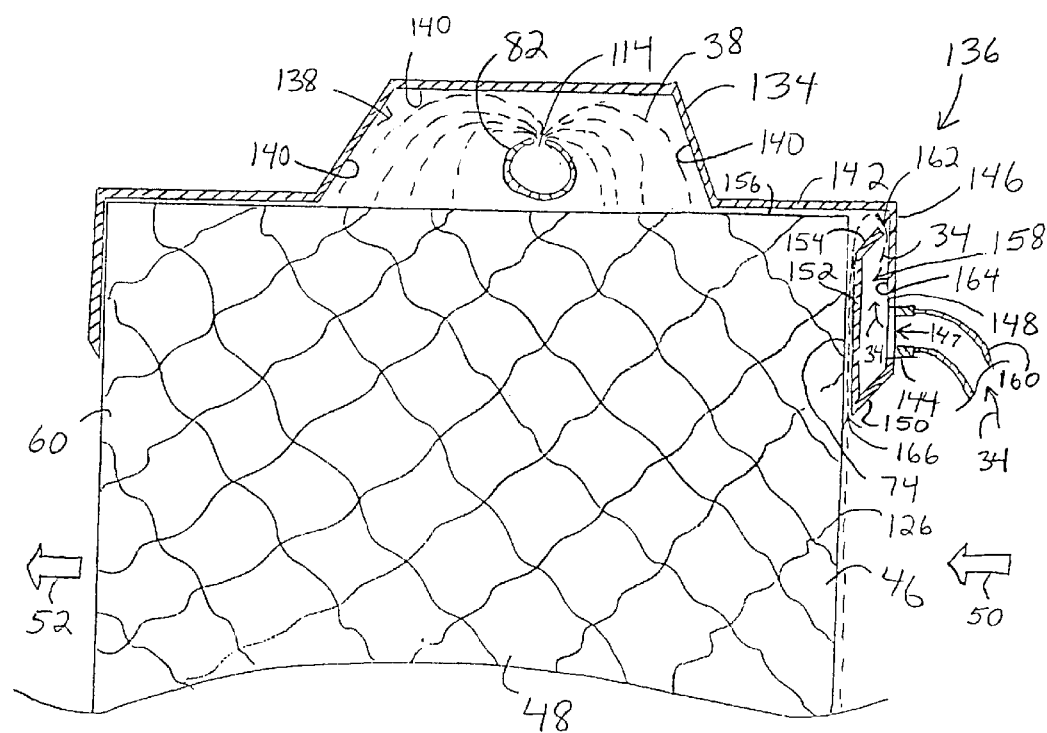
FIG. 4 shows a sectional side view of a shield and water distributor elements in an alternative embodiment of the present invention.

FIG. 4 shows a sectional side view of a shield 134 and a fresh water delivery system 136 in accordance with an alternative embodiment of the present invention. In this alternative embodiment, shield 134 replaces shield 76

(FIGS. 1–3) of evaporative cooling apparatus 20. Likewise, fresh water delivery system 136 replaces fresh water delivery system 54 (FIG. 2) of evaporative cooling apparatus 20 (FIG. 1). The remainder of evaporative cooling apparatus 20 remains unchanged.

Like second compartment 120 (FIG. 3) of shield 76 (FIG. 3), shield 134 includes a compartment 138 in which second distribution pipe 82 is positioned. Inner surfaces 140 of compartment 138 direct sump water 38 over air outlet portion 60 of cooling media 48. Fresh water delivery system 136 is integral to shield 134. However, a partition 142 is interposed between compartment 138 and fresh water delivery system 136. Partition 142 largely prevents particulate laden sump water 38 from flowing through air inlet portion 46 of cooling media 48. In addition, partition 142 largely prevents sump water 38 from contaminating fresh water delivery system 136.

Fresh water delivery system 136 includes an inlet 144 in fluid communication with a distributor element 146 through an aperture 147 in a front section 148 of distributor element 146. A valve (not shown), such as float valve 72 (FIG. 2), is in fluid communication with inlet 144 through coupling along a conduit 160 of fresh water delivery system 136 for enabling receipt of fresh water 34 into fresh water delivery system 136 in response to a water level in sump 40 (FIG. 2). In addition, like fresh water delivery system 54, backflow prevention device 35 (FIG. 1) may be coupled in-line with inlet 144 to prevent a backflow of sump water 38 from evaporative cooling apparatus 20 (FIG. 1) toward the water source to prevent contamination of the water source (not shown).

Distributor element 146 includes front section 148, a bottom section 150, a back section 152, and a top section 154. Front section 148 extends from partition 142 and is directed downwardly relative to a top surface 156 of cooling media 48. Front section 148 conceals upper edge 74 of cooling media 48. Bottom section 150 is contiguous with front section 148 and extends toward cooling media 48. Back section 152 is contiguous with bottom section 150 and is directed toward top surface 156 of cooling media 48. Top section 154 is contiguous with back section 152 and is directed away from cooling media 48. End caps 172 (shown in FIG. 6) seal each end of distributor element 136. Thus, front, bottom, back, and top sections 148, 150, 152, and 154, respectively, and end caps 172 cooperate to form a cavity 158 in distributor element 146 into which fresh water 34 flows from inlet 144.

A slot 162 is formed between top section 154 and an inner surface 164 of front section 148. Fresh water 34 flows from slot 162 through a gap 166 formed between back section 152 and upper edge 74 of cooling media 48. The delivery of fresh water 34 through slot 162 produces a sheet-like flow of fresh water 34 to the point of highest evaporation, that is face 126 of cooling media 48. This sheet-like flow wets cooling media 48 evenly across face 126. The sheet-like flow prevents the problem of streaking, i.e., the buildup of scale along flow paths formed in cooling media 48 when fresh water 34 is delivered through discrete openings, such as openings 78 (FIG. 2). In addition, through the use of fresh water delivery system 136, the fabrication and maintenance of wet section 24 (FIG. 1) is simplified by eliminating some wet components, in particular, fresh water conduit 64 (FIG. 2).

Figure 5:
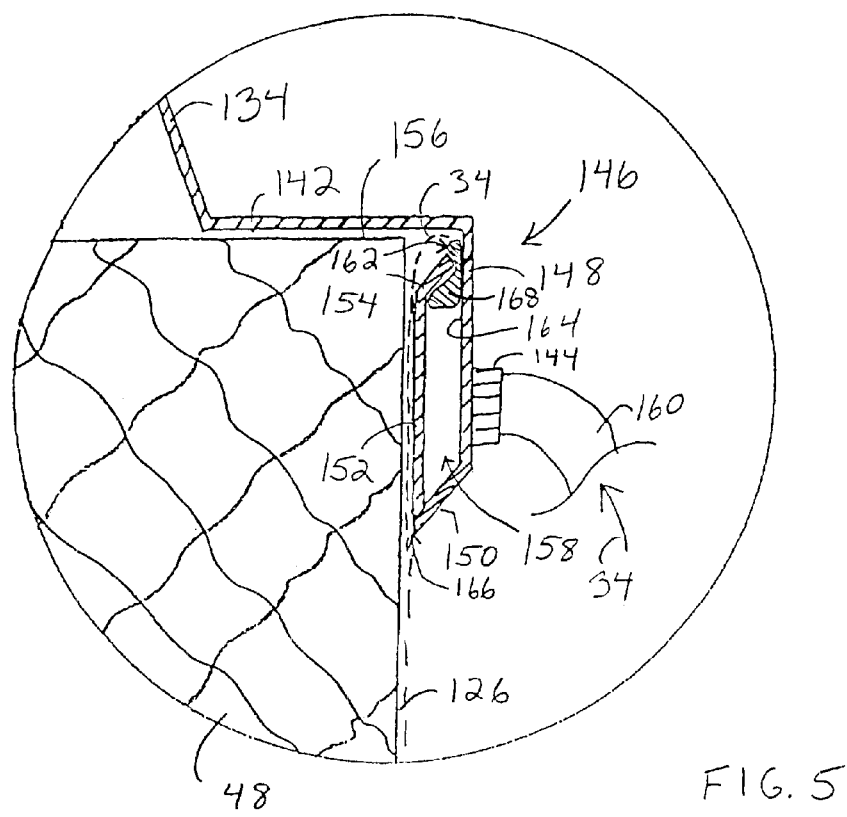
FIG. 5 shows an enlarged sectional side view of a fresh water distributor element of the alternative embodiment of FIG. 4.

FIG. 5 shows an enlarged sectional side view of fresh water distributor element 146 of the alternative embodiment of FIG. 4. Fresh water delivery system 146 may include a wicking material 168 positioned in slot 162. Fresh water 34 exits from cavity 158 through slot 162 by soaking through wicking material 168. Wicking material 168 controls the flow rate of fresh water 34 exiting cavity 158. In addition, wicking material 168 aids in the uniform delivery of fresh water 34 across face 126 of cooling media 48

Figure 6:
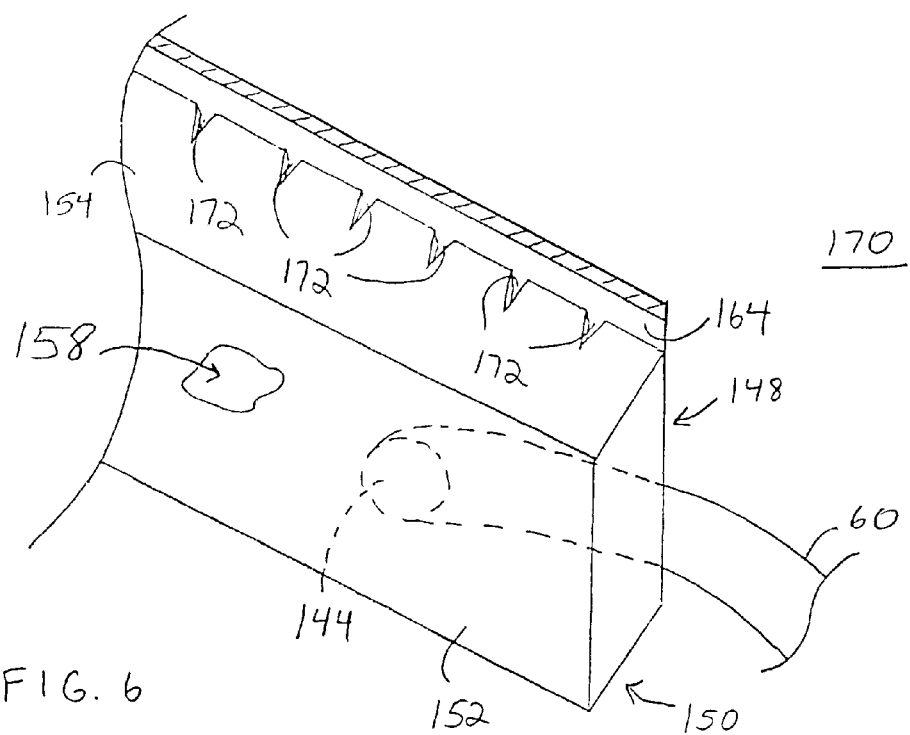
FIG. 6 shows a perspective view of a fresh water distributor element in accordance with another alternative embodiment of the present invention.

FIG. 6 shows a perspective view of a fresh water distributor element 170 in accordance with another alternative embodiment of the present invention. Fresh water distributor element 170 is similar to distributor element 146. That is, distributor element 170 includes front section 148 configured to extend from partition 142 (FIG. 4) and configured to be oriented downwardly relative to a top surface 156 (FIG. 4) of cooling media 48 (FIG. 4). Likewise, distributor element 170 includes bottom section 150 contiguous with front section 148 and extending toward cooling media 48, back section 152 contiguous with bottom section 150 and directed toward top surface 156 of cooling media 48, and top section 154 contiguous with back section 152 and directed away from cooling media 48. End caps 172 (of which only one is shown) seal each end of distributor element 170. Like distributor element 146, front, bottom, back, and top sections 148, 150, 152, and 154, respectively, and end caps 172 cooperate to form cavity 158 in distributor element 146 into which fresh water 34 flows from inlet 144.

Top section 154 of distributor element 170 is coupled to inner surface 164 of front section 148 to form a watertight seal between top section 154 and inner surface 164. In other words, distributor element 170 does not include slot 162 (FIG. 4) of distributor element 146. The coupling of top section 154 to inner surface may be performed by welding, caulking, and so forth.

Top section 154 of distributor element 170 includes plurality of spaced-apart openings, or notches 172. Fresh water 34 flows out of cavity 158 through notches 172 to flow through a gap, i.e., gap 166 (FIG. 4) between back section 152 and upper edge 74 (FIG. 4) of cooling media 48 over face 126 (FIG. 4). Through the use of fresh water distributor element 170, the fabrication and maintenance of wet section 24 (FIG. 1) is simplified by eliminating some wet components, in particular, fresh water conduit 64 (FIG. 2). Moreover, wicking material 168 (FIG. 5) is not used, thereby decreasing maintenance costs over distributor element 146.

In summary, the present invention teaches of an evaporative cooling apparatus that effectively controls the buildup of mineral deposits on the cooling media. The buildup of mineral deposits is controlled by wetting the face of the cooling media that first receives outside air, i.e., the point of greatest evaporation, with low particulate content fresh water obtained from an external water source. The remainder of the cooling media is wetted using recirculated, or high particulate content sump water. In addition, the face of the cooling media is periodically rinsed in response to a periodic flushing of sump water to further control mineral buildup on the face of the cooling media. The efficiency of the evaporative cooling apparatus is enhanced and the life of the cooling media and wet components is extended by controlling the amount of mineral buildup on the cooling media, thereby decreasing manufacturing and maintenance costs. In addition, the evaporative cooling apparatus is readily employed in high air volume industrial settings.

Although the preferred embodiments of the invention have been illustrated and described in detail, it will be readily apparent to those skilled in the art that various modifications may be made therein without departing from the spirit of the invention or from the scope of the appended claims. For example, the present invention may be adapted for use with an evaporative cooling apparatus that has cooling media positioned adjacent two or more sides of the housing. In addition, the present invention may be adapted for use in other settings where evaporative cooling may be desired, such as in residences and cooling towers.

What is claimed is:

1. An evaporative cooling apparatus comprising:
   a housing having an air entry side, an air exit side, and a sump;
   cooling media contained in said housing, said cooling media having an air inlet portion and an air outlet portion, said air inlet portion being adjacent said air entry side of said housing;
   a fresh water delivery system for delivering fresh water to said air inlet portion of said cooling media;
   a recirculated water delivery system for delivering sump water from said sump to said air outlet side of said cooling media; and
   a fan section proximate said air exit side of said housing, said fan section drawing air through said air entry side of said housing and into said cooling media from said air inlet portion through said air outlet portion to cool said air.

2. An evaporative cooling apparatus as claimed in claim 1 wherein said fresh water is obtained from a water source external to said evaporative cooling apparatus, and said fresh water delivery system comprises:
   an inlet adapted to receive said fresh water from said water source; and
   a distributor element positioned proximate an upper edge of said cooling media, said distributor element being in fluid communication with said inlet for receiving said fresh water, and said distributor element having an opening through which said fresh water flows from said distributor element over said air inlet portion of said cooling media.

3. An evaporative cooling apparatus as claimed in claim 2 wherein said fresh water delivery system further comprises a float valve in fluid communication with said inlet for enabling receipt of said fresh water into said fresh water delivery system from said water source in response to a water level in said sump.

4. An evaporative cooling apparatus as claimed in claim 2 wherein said distributor element is a pipe, and said opening is one of a plurality of spaced-apart openings along said pipe.

5. An evaporative cooling apparatus as claimed in claim 4 further comprising a shield covering said pipe, said shield directing said fresh water over a face of said air inlet portion of said cooling media.

6. An evaporative cooling apparatus as claimed in claim 5 wherein each of said plurality of spaced-apart openings is upwardly and forwardly oriented on said pipe to cause said fresh water exiting said each opening to contact an inside front surface of said shield.

7. An evaporative cooling apparatus as claimed in claim 5 wherein said shield includes a front surface having a downwardly extending lip, said lip covers an upper edge of said cooling media, and said fresh water flows through a gap between said lip and said upper edge of said cooling media over said face of said air inlet portion of said cooling media.

8. An evaporative cooling apparatus as claimed in claim 2 wherein said distributor element comprises:
   a front section directed downwardly relative to a top surface of said cooling media and concealing said upper edge of said cooling media;
   a bottom section contiguous with said front section and extending toward said cooling media;
   a back section contiguous with said bottom section and directed toward said top surface of said cooling media; and
   a top section contiguous with said back section and directed away from said cooling media, said front, bottom, back, and top sections cooperating to form a cavity in said distributor element into which said fresh water flows from said inlet.

9. An evaporative cooling apparatus as claimed in claim 8 wherein said opening is a slot formed between said top section and an inner surface of said front section, and said fresh water flows from said slot through a gap between said back section and said upper edge of said cooling media over said face of said air inlet portion of said cooling media.

10. An evaporative cooling apparatus as claimed in claim 9 wherein said fresh water delivery system further comprises wicking material positioned in said slot.

11. An evaporative cooling apparatus as claimed in claim 8 wherein said top section is coupled to an inner surface of said front section to form a watertight seal between said top section and said inner surface, and said opening is one of a plurality of spaced-apart notches along said top section, and said fresh water flows from said spaced-apart notches through a gap between said back section and said upper edge of said cooling media over said face of said air inlet portion of said cooling media.

12. An evaporative cooling apparatus as claimed in claim 8 wherein said front section includes an aperture in fluid communication with said inlet for receiving said fresh water.

13. An evaporative cooling apparatus as claimed in claim 1 wherein said recirculated water delivery system comprises:
   a pump having a water inlet positioned in said sump for drawing said sump water from said sump and having a water outlet; and
   a distributor element having a first end in communication with said water outlet of said pump for receiving said sump water, and a longitudinal portion positioned above said cooling media and including an opening for allowing a flow of said sump water from said distributor element over said air outlet portion of said cooler pad.

14. An evaporative cooling apparatus as claimed in claim 13 wherein said recirculated water delivery system further comprises:
   a control valve in communication with a second end of said distributor element, said control valve being in a closed position to prevent escape of said sump water from said recirculated water delivery system; and
   an outlet in fluid communication with an outlet side of said control valve, said control valve being periodically opened to expel said sump water from said distributor element through said outlet.

15. An evaporative cooling apparatus as claimed in claim 14 further comprising a timer for actuating said control valve to open at predetermined intervals.

16. An evaporative cooling apparatus as claimed in claim 14 further comprising a conductivity sensor for actuating said control valve to open when a detected particulate content of said sump water exceeds a predetermined particulate content level.

17. An evaporative cooling apparatus as claimed in claim 13 further comprising a shield covering said longitudinal portion of said distributor element, said shield directing said sump water over said air outlet portion of said cooling media.

18. An evaporative cooling apparatus as claimed in claim 1 wherein:
   said fresh water delivery system comprises a first distributor element having a first opening for allowing a flow of said fresh water from said first distributor element to said air inlet portion of said cooling media;
   said recirculated water delivery system comprises a second distributor element having a second opening for allowing a flow of said sump water from said second distributor element to said air outlet portion of said cooling media; and
   said evaporative cooling apparatus further comprises a shield positioned over said cooling media, said shield having a partition separating said shield into a first compartment and a second compartment, said first distributor element being positioned in said first compartment, and said second distributor element being positioned in said second compartment.

19. An evaporative cooling apparatus as claimed in claim 1 wherein said fresh water is obtained from a water source external to said evaporative cooling apparatus, and said evaporative cooling apparatus further comprises a backflow prevention device in fluid communication with said fresh water delivery system for preventing a flow of said sump water toward said water source.

20. In an evaporative cooling apparatus, a method for controlling a buildup of mineral deposits, said evaporative cooling apparatus including cooling media contained in a housing, a fresh water delivery system for delivering fresh water from an external source to an air inlet portion of said cooling media, and a recirculated water delivery system for delivering sump water from a sump of said housing to an air outlet portion of said cooling media, said method comprising:
   positioning said fresh water delivery system proximate said air inlet portion of said cooling media;
   positioning said recirculated water delivery system proximate said air outlet portion of said cooling media;
   delivering said sump water through said recirculated water delivery system to said air outlet side of said cooling media to wet said air outlet side of said media; and
   periodically flushing a quantity of said sump water from said evaporative cooling apparatus via said recirculated water delivery system.

21. A method as claimed in claim 20 further comprising cleaning particulates that cause said buildup of mineral deposits from an interior surface of said recirculated water delivery system by a rapid flow of said sump water through said recirculated water delivery system during said flushing operation.

22. A method as claimed in claim 21 further comprising:
   sensing a decrease in a water level in said sump responsive to said flushing operation;
   enabling a flow of said fresh water into said fresh water delivery system in response to said sensing operation; and
   rinsing said air inlet portion of said cooling media with said fresh water following said enabling operation to remove said particulates from said air inlet portion of said cooling media.

23. A method as claimed in claim 22 further comprising performing said flushing, cleaning, and rinsing operations substantially simultaneously.

24. An evaporative cooling apparatus for utilizing fresh water obtained from an external water source to control a buildup of mineral deposits in said apparatus, said apparatus comprising:
   a housing having an air entry side, an air exit side, and a sump;
   cooling media contained in said housing, said cooling media having an air inlet portion and an air outlet portion, said air inlet portion being adjacent said air entry side of said housing;
   a fresh water delivery system for delivering said fresh water to said air inlet portion of said cooling media, said fresh water delivery system including:
      an inlet adapted to receive said fresh water from said external water source;
      a float valve coupled to said inlet for enabling receipt of said fresh water into said fresh water delivery system from said water source in response to a water level in said sump; and
      a distributor element having a first end in fluid communication with said inlet for receiving said fresh water, said distributor element being positioned above said cooling media and including an opening through which said fresh water flows from said distributor element over said air inlet portion of said cooling media;
   a shield covering said distributor element, said shield directing said fresh water over a face of said air inlet portion of said cooling media;
   a recirculated water delivery system for delivering sump water from said sump to said air outlet side of said cooling media; and
   a fan section proximate said air exit side of said housing, said fan section drawing air through said air entry side of said housing and into said cooling media from said air inlet portion through said air outlet portion to cool said air.

25. An evaporative cooling apparatus as claimed in claim 24 wherein said recirculated water delivery system comprises:
   a pump having a water inlet positioned in said sump for drawing said sump water from said sump and having a water outlet;
   a distributor element having a first end in communication with said water outlet of said pump for receiving said sump water, and a longitudinal portion positioned above said cooling media and including an opening for allowing a flow of said sump water from said distributor element over said air outlet portion of said cooler pad;
   a control valve in communication with a second end of said distributor element; and
   an outlet in fluid communication with an outlet side of said control valve, said control valve being periodically opened to expel said sump water from said distributor element through said outlet lowering said water level in said sump and causing said float valve to enable receipt of said fresh water.

26. An evaporative cooling apparatus as claimed in claim 25 wherein said opening in said distributor element is upwardly and forwardly positioned to cause said fresh water exiting said opening to contact an inside front surface of said shield.

27. An evaporative cooling apparatus for utilizing fresh water obtained from an external water source to control a buildup of mineral deposits in said apparatus, said apparatus comprising:

a housing having an air entry side, an air exit side, and a sump;

cooling media contained in said housing, said cooling media having an air inlet portion and an air outlet portion, said air inlet portion being adjacent said air entry side of said housing;

a fresh water delivery system including:
  a fresh water inlet adapted to receive said fresh water from said water source; and
  a first distributor element in fluid communication with said fresh water inlet for receiving said fresh water, said first distributor element being positioned proximate said cooling media, and said first distributor element including a first opening through which said fresh water flows from said first distributor element over said air inlet portion of said cooling media;

a recirculated water delivery system including:
  a pump having a water inlet positioned in said sump for drawing said sump water from said sump and having a water outlet; and
  a second distributor element having an inlet end in communication with said water outlet of said pump for receiving said sump water, and a longitudinal portion positioned above said cooling media and including a second opening for allowing a flow of said sump water from said second distributor element over said air outlet portion of said cooler pad; and
  a fan section proximate said air exit side of said housing, said fan section drawing air through said air entry side of said housing, said air being pulled through said cooling media from said air inlet portion through said air outlet portion to cool said air.

28. An evaporative cooling apparatus as claimed in claim 27 further comprising:
  a first shield covering said first distributor element, said first shield directing said fresh water over a face of said air inlet portion of said cooling media; and
  a second shield covering said longitudinal portion of said second distributor element, said second shield directing said sump water over said air outlet portion of said cooling media.

29. An evaporative cooling apparatus as claimed in claim 27 further comprising:
  said first distributor element comprises:
    a front section directed downwardly from a top surface of said cooling media and concealing said upper edge of said cooling media;
    a bottom section contiguous with said front section and extending toward said cooling media;
    a back section contiguous with said bottom section and directed toward said top surface of said cooling media; and
    a top section contiguous with said back section and directed away from said cooling media, said front, bottom, back , and top sections cooperating to form a cavity in said distributor element into which said fresh water flows from said inlet;
  a shield covering said longitudinal portion of said second distributor element, said shield directing said sump water over said air outlet portion of said cooling media; and
  a partition interposed between said front section of said first distributor element and said shield.

* * * * *